US007766241B2

(12) United States Patent  
Tomita

(10) Patent No.: US 7,766,241 B2  
(45) Date of Patent: Aug. 3, 2010

(54) BARCODE FOR TWO-WAY VERIFICATION OF A DOCUMENT

(75) Inventor: Hiroshi Tomita, San Carlos, CA (US)

(73) Assignee: Konica Minolta Systems Laboratory, Inc., Huntington Beach, CA (US)

( * ) Notice: Subject to any disclaimer, the term of this patent is extended or adjusted under 35 U.S.C. 154(b) by 978 days.

(21) Appl. No.: 11/541,138

(22) Filed: Sep. 29, 2006

(65) Prior Publication Data

US 2008/0078836 A1    Apr. 3, 2008

(51) Int. Cl.  
*G06K 7/10* (2006.01)
(52) U.S. Cl. .......................... 235/462.11; 235/462.01; 235/462.08; 235/462.09; 713/176; 713/189
(58) Field of Classification Search ............ 235/462.11, 235/462.01, 462.08, 462.09; 713/176, 189  
See application file for complete search history.

(56) References Cited

U.S. PATENT DOCUMENTS

| | | | |
|---|---|---|---|
| 5,016,214 A | 5/1991 | Laymoun |
| 5,243,655 A | 9/1993 | Wang et al. |
| 5,325,167 A | 6/1994 | Melen |
| 5,337,362 A | 8/1994 | Gormish et al. |
| 5,388,158 A | 2/1995 | Berson |
| 5,486,686 A | 1/1996 | Zdybel, Jr. et al. |
| 5,490,217 A | 2/1996 | Wang et al. |
| 5,506,697 A | 4/1996 | Li et al. |
| 5,544,045 A | 8/1996 | Garland et al. |
| 5,576,528 A | 11/1996 | Chew et al. |
| 5,606,609 A | 2/1997 | Houser et al. |
| 5,612,524 A | 3/1997 | Sant' Anselmo et al. |
| 5,671,282 A | 9/1997 | Wolff et al. |
| 5,680,470 A | 10/1997 | Moussa et al. |
| 5,734,800 A | 3/1998 | Herbert et al. |
| 5,754,697 A | 5/1998 | Fu et al. |
| 5,760,382 A | 6/1998 | Li et al. |
| 5,799,082 A | 8/1998 | Murphy et al. |
| 5,862,270 A | 1/1999 | Lopresti et al. |
| 5,905,800 A | 5/1999 | Moskowitz et al. |
| 5,956,409 A | 9/1999 | Chan et al. |
| 5,987,153 A | 11/1999 | Chan et al. |
| 6,035,406 A | 3/2000 | Moussa et al. |
| 6,082,619 A | 7/2000 | Ma et al. |
| 6,115,508 A | 9/2000 | Lopresti et al. |

(Continued)

OTHER PUBLICATIONS

Adobe Acrobat, retrieved from http://en.wikipedia.org/wiki/Adobe_Acrobat on Dec. 19, 2008, 7 pages.

(Continued)

*Primary Examiner*—Allyson N Trail  
(74) *Attorney, Agent, or Firm*—Finnegan, Henderson, Farabow, Garrett & Dunner, LLP

(57) ABSTRACT

Systems, methods and storage mediums are disclosed for processing images and two-dimensional barcodes for two-way verification of document data. In one exemplary embodiment, image data of a document is obtained, processed and rendered into a barcode for incorporation into a reproduction of the document image. The barcode may overlap the document image which allows it to be placed anywhere in the document. Moreover, the barcode may overlap certain portions such that it conceals confidential information while maintaining the integrity of the confidential information within encoded data of the barcode.

21 Claims, 9 Drawing Sheets

U.S. PATENT DOCUMENTS

| | | | |
|---|---|---|---|
| 6,173,154 | B1 | 1/2001 | Kucinski et al. |
| 6,212,504 | B1 | 4/2001 | Hayosh |
| 6,285,775 | B1 | 9/2001 | Wu et al. |
| 6,320,982 | B1 | 11/2001 | Kurzweil et al. |
| 6,382,510 | B1 | 5/2002 | Ni |
| 6,418,244 | B2 | 7/2002 | Zhou et al. |
| 6,498,660 | B2 | 12/2002 | Haltmaier |
| 6,522,770 | B1 | 2/2003 | Seder et al. |
| 6,565,003 | B1 | 5/2003 | Ma |
| 6,567,530 | B1 | 5/2003 | Keronen et al. |
| 6,674,456 | B2 | 1/2004 | Miyazaki |
| 6,694,042 | B2 | 2/2004 | Seder et al. |
| 6,694,043 | B2 | 2/2004 | Seder et al. |
| 6,839,844 | B1 | 1/2005 | Okano |
| 6,917,724 | B2 | 7/2005 | Seder et al. |
| 7,020,327 | B2 | 3/2006 | Tack-don et al. |
| 7,020,435 | B2 | 3/2006 | Moulthrop et al. |
| 7,032,823 | B2 | 4/2006 | Nojiri |
| 7,040,539 | B1 | 5/2006 | Stover |
| 7,088,857 | B2 | 8/2006 | Zuniga |
| 7,152,047 | B1 * | 12/2006 | Nagel .......................... 705/76 |
| 7,166,347 | B2 | 1/2007 | Inoue et al. |
| 7,185,816 | B1 | 3/2007 | Shoobridge |
| 7,197,644 | B2 | 3/2007 | Brewington |
| 7,523,865 | B2 | 4/2009 | Tomita |
| 7,533,817 | B2 | 5/2009 | Ming et al. |
| 2002/0110798 | A1 | 8/2002 | Kucinski et al. |
| 2002/0164053 | A1 | 11/2002 | Seder et al. |
| 2002/0181736 | A1 | 12/2002 | Seder et al. |
| 2002/0181737 | A1 | 12/2002 | Seder et al. |
| 2003/0120930 | A1 | 6/2003 | Simpson et al. |
| 2004/0003255 | A1 | 1/2004 | Apvrille et al. |
| 2004/0027601 | A1 | 2/2004 | Ito et al. |
| 2004/0185424 | A1 | 9/2004 | Kucinski et al. |
| 2004/0202386 | A1 | 10/2004 | Quine |
| 2005/0111867 | A1 | 5/2005 | Hatano |
| 2005/0132194 | A1 | 6/2005 | Ward |
| 2005/0259876 | A1 | 11/2005 | Ogawa |
| 2006/0017802 | A1 | 1/2006 | Yoo et al. |
| 2006/0034505 | A1 | 2/2006 | Luk-Pat et al. |
| 2006/0056735 | A1 | 3/2006 | De Haan |
| 2006/0124744 | A1 | 6/2006 | Gormish et al. |
| 2007/0022053 | A1 | 1/2007 | Waserstein et al. |
| 2007/0036371 | A1 | 2/2007 | Buil et al. |
| 2007/0139710 | A1 | 6/2007 | Ohta |
| 2007/0176000 | A1 | 8/2007 | Cattrone et al. |
| 2007/0176001 | A1 | 8/2007 | Cattrone et al. |
| 2007/0211310 | A1 | 9/2007 | Kadota |
| 2007/0229915 | A1 | 10/2007 | Iida |
| 2007/0241554 | A1 | 10/2007 | Wicker et al. |
| 2008/0016358 | A1 * | 1/2008 | Filreis et al. ................. 713/176 |
| 2008/0048044 | A1 | 2/2008 | Zhao et al. |
| 2008/0080777 | A1 | 4/2008 | Tomita |
| 2008/0114927 | A1 | 5/2008 | Yao et al. |
| 2008/0173718 | A1 | 7/2008 | Ibe |
| 2008/0216004 | A1 | 9/2008 | Cheng et al. |
| 2009/0031135 | A1 | 1/2009 | Kothandaraman |
| 2009/0194592 | A1 | 8/2009 | Ming et al. |

OTHER PUBLICATIONS

Adobe Photoshop, retrieved from http://en.wikipedia.org/wiki/Adobe_Photoshop on Jan. 3, 2009, 6 pages.

Adobe® 6.0 Acrobat® Curriculum Guide, Adobe, 2003, lessons 3-5, 27 pages.

Altavion, First Amended Complaint, pleading, Dec. 15, 2008, pp. 43, San Mateo County Superior Court, USA.

Konica/Minolta, Cross Complaint, pleading, Oct. 27, 2008, pp. 13, San Mateo County Superior Court, USA.

Altavion, Inc., Complaint, pleading, Nov. 9, 2007, pp. 26, San Mateo County Superior Court, USA.

Antognini, T., A Flexibly Configurable 2D Bar Code, white paper based on paper delivered to the Information Based Indicia Program Technology Symposium, sponsored by the US Postal Service, Nov. 25-26, 1996, 24 pages.

Barcode Introduction: PDF417 Symbology, Barcode Technology Online, retrieved from http://www.barcode-controls.com/PDF417.html on Dec. 19, 2008, 5 pages, EaseSoft Inc.

Computer Dictionary, The Comprehensive Standard for Business, School, Library, and Home, 1994, pp. 106 and 146, Second Edition, Microsoft Press.

Conrad, E., Explanation of The Three Types of Cryptosystems—GIAC Research in the Common Body of Knowledge, Feb. 6, 2007, retrieved from http://www.giac.org/resources/whitepaper/cryptography/52.php (1 of 5) on Dec. 3, 2008, 5 pages.

Data Compression, retrieved from http://en.wikipedia.org/wiki/Data_compression on Dec. 2, 2008, 6 pages.

Data matrix (computer), retrieved from http://en.wikipedia.org/wiki/Data_matrix_(computer) on Dec. 19, 2008, 4 pages.

DataGlyphs® Frequently Asked Questions (FAQ), Palo Alto Research Center Incorporated, retrieved from http://www.parc.com/research/projects/dataglyphs/faq.html on Dec. 18, 2008, 10 pages.

Definitions, Encryption, SearchSecurity.com (powered by WhatIs.com), retrieved from http://searchsecurity.techtarget.com/sDefinition/0,,sid14_gci212062,00.html on Dec. 2, 2008, 4 pages, TechTarget.

Encryption Algorithms, retrieved from http://www.mycrypto.net/encryption/crypto_algorithms.html on Dec. 2, 2008, 3 pages.

Encryption, retrieved from http://en.wikipedia.org/wiki/Encryption on Dec. 2, 2008, 2 pages.

Firth, P. Using Barcodes in Documents—Best Practices, Pegasus Imaging Corporation, 2007, 9 pages.

Gengler, B., Adobe Integrates Secures PDF with XML—Business Software—IT Business Special Report, retrieved from http://www.identrust.com/company/press_releases/2004/release_040615.html on Dec. 1, 2008, dated Jun. 14, 2004, 2 pages, press release in The Australian.

Goebel, G., Data Compression, In The Public Domain, Mar. 1, 2007, v1.2./TOC (3 chapters) Public Domain, retrieved from http://www.vectorsite.net/ttdcmp.html on Dec. 2, 2008, 2 pages.

McDaniel, G., IBM Dictionary of Computing, Aug. 1993, pp. 129 and 235, Tenth Edition, McGraw-Hill, Inc.

McGraw-Hill Dictionary of Scientific and Technical Terms, 2003, p. 548, Sixth Edition, McGraw-Hill.

Pretty Good Privacy, retrieved from http://en.wikipedia.org/wiki/Pretty_Good_Privacy on Dec. 11, 2008, 9 pages.

Product Reviews: Design/DTP—Acrobat 4, PC PRO Computing in the Real World, Apr. 2000, Issue 58, retrieved from http://www.pcpro.co.uk/reviews/79/acrobat-4.html on Jan. 14, 2009, 2 pages.

QR Code Barcode (Quick Response Barcode), TechnoRiver, retrieved from http://www.technoriversoft.com/QRCODEBarcode.html on Dec. 18, 2008, 2 pages.

Resnick, P., Standards Track—Internet Message Format, Oct. 2008, 57 pages, The IETF Trust.

Sci-Tech Encyclopedia: Data Compression, 2008, retrieved from http://www.answers.com/topic/data-compression on Dec. 2, 2008, 12 pages.

Sedgewick, J. Image Stitching Using Photoshop, 2003, 4 pages.

Specifications for Popular 2D Bar Codes, Bar Code 1: A Web of Information About Bar Code 2-Dimensional Bar Code Page, retrieved from http://www.adams1.com/stack.html on Dec. 2, 2008, 9 pages.

The American Heritage Dictionary of the English Language, 2006, p. 44, 4$^{th}$ edition, Houghton Mifflin Company.

Tutorial: 1. Introduction to image slicing, How to slice an image, Mar. 22, 2002, 5 pages, Elated Communications Ltd.

Altavion, Second Amended Complaint, May 22, 2009, (49 pages), San Mateo County Superior Court, USA.

Altavion, Notice of Entry on Order Sustaining Defendant's Demurrer to Plaintiff Altavion's Second Amended Complaint, including Exhibit A, Sep. 28, 2009, (7 pages), San Mateo County Superior Court, USA.

Altavion, Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (3 pages), San Mateo County Superior Court, USA.

Altavion, Memorandum of Points and Authorities in Support of Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (20 pages), San Mateo County Superior Court, USA.

Altavion, Request for Judicial Notice of Support of Defendants' Demurrer to Altavion's Second Amended Complaint, Jun. 23, 2009, (3 pages), San Mateo County Superior Court, USA.

Altavion, Declaration of Laura R. Mason in Support of Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (2 pages), San Mateo County Superior Court, USA.

Altavion, Reply Brief in Support of Defendants' Demurrer to Altavion Inc.'s Second Amended Complaint, Aug. 20, 2009, (15 pages), San Mateo County Superior Court, USA.

Attachment I, Facts Supporting Plaintiff's Claims 4-7 Which are Separate from Plaintiff's Trade Secret Claim 1 [Redacted Portions Filed Under Seal], bearing Aug. 13, 2009 on its face, (6 pages), San Mateo County Superior Court, USA.

* cited by examiner

BARCODE FOR TWO-WAY VERIFICATION OF A DOCUMENT

BACKGROUND

1. Field of the Invention

The present invention relates to processing a document and associated barcode, and, more particularly, to verification and other image processing features associated with the document and the barcode.

2. Description of Related Information

Barcoding is a widely used mechanism for facilitating the secure storage and communication of information. For example, barcodes are often used in retail environments for representing product identification numbers and prices. Alternatively, barcodes have been used on such objects as personal ID cards, driver's licenses and passports as a way to store alpha-numeric data such as names and dates.

Existing barcode systems are used to associate barcodes with documents such as hardcopy paper documents and electronic documents to facilitate their storage and distribution. Systems for transmitting documents and communicating related information sometimes include components capable of providing documents, such as textual, schematic, diagrammatic, graphical and photographic documents, in a secure manner. For example, barcodes have been associated with medical prescriptions for verifying contents therein. Accordingly, a pharmacy can scan a barcode located on a paper prescription to ensure that the drug name and dosage stored in the barcode are consistent with the information handwritten on the prescription. However, such components still generally leave the documents vulnerable to certain varieties of unauthorized tampering and alteration.

Thus, at the present time, existing barcode systems have not captured the amount of image data from a document sufficient for use in fully reproducing the document. Moreover, many barcode systems are limited to storage of information that is pre-existing within a database of barcode information and do not employ two-way comparison between the barcode and document image data. Finally, these systems have failed to sufficiently employ barcodes for concealing and/or encrypting confidential document information.

Accordingly, there is a need for a system and method of associating barcodes with documents such that the barcodes may encode enough information to create a reproduction of the document. There is also a need for transmission of sensitive documents wherein document image data can be safely stored in an encrypted barcode prior to transmission for subsequent comparison to the face of the document. Moreover, there is a need for barcodes that may overlap the image or reproduced image, while still providing the ability to verifying correspondence between the image and the barcode. Also, there is a need to conceal confidential information on the face of a document by overlapping the information with an encrypted barcode, from which the information can be recovered.

In sum, there is a need for a system and method for processing image data associated with a document in order to create a barcode, from which the document can be reproduced. Features such as reproducing a barcode anywhere on the document or in the reproduced image of the document, including overlap of confidential information, are also desired.

SUMMARY OF THE INVENTION

Systems, methods, and articles of manufacture consistent with one or more embodiments of the present invention are directed to processing document image data from a document to produce a barcode, from which the original image may be reproduced, wherein the barcode may also overlap its associated document.

In accordance with one exemplary embodiment, an image data processing system is provided that processes images and two-dimensional barcodes associated with the images. Moreover, the system includes: an image obtaining component that receives an original image or original image data to be processed; a storage component that stores a program of instructions including instructions for generating barcode data for a two-dimensional barcode to be associated with the original image, wherein the two-dimensional barcode encodes a representation of the original image such that the original image can be reproduced from the two-dimensional barcode; a processor that processes the image data; a barcode producing component that produces the two-dimensional barcode based on the original image data; and a document producing component that creates a reproduction of the original image such that the two-dimensional barcode overlaps the original image.

In further embodiments, the barcode may be associated with the reproduced document such that it conceals a portion of the original image on which confidential information is disclosed.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Systems, methods and articles of manufacture directed to document imaging, barcode creation, and associated data processing are disclosed. Specifically, information based on a document's original image data may be processed to create a barcode for association with the document (e.g., rendering on a reproduction of the document, placement on the original document, etc.). In further embodiments of the present invention, the barcode may be associated with the document such that it conceals a portion of the original image on which confidential information is disclosed.

In other embodiments of the present invention, an image data processing system is disclosed that processes images and two-dimensional barcodes associated with the images wherein the system may include an image obtaining component, a storage component, a processor, a barcode producing component, and a document producing component. In a further embodiment, the document producing component creates a reproduction of the original image such that the barcode produced by the barcode producing component overlaps the image. Accordingly, because the two-dimensional barcode may overlap the original image, it may be placed anywhere on the document or in the reproduced image. These embodiments thereby overcome significant disadvantages of existing systems, such as the requirement for a search process to determine acceptable placement of the barcode.

Figure 1:
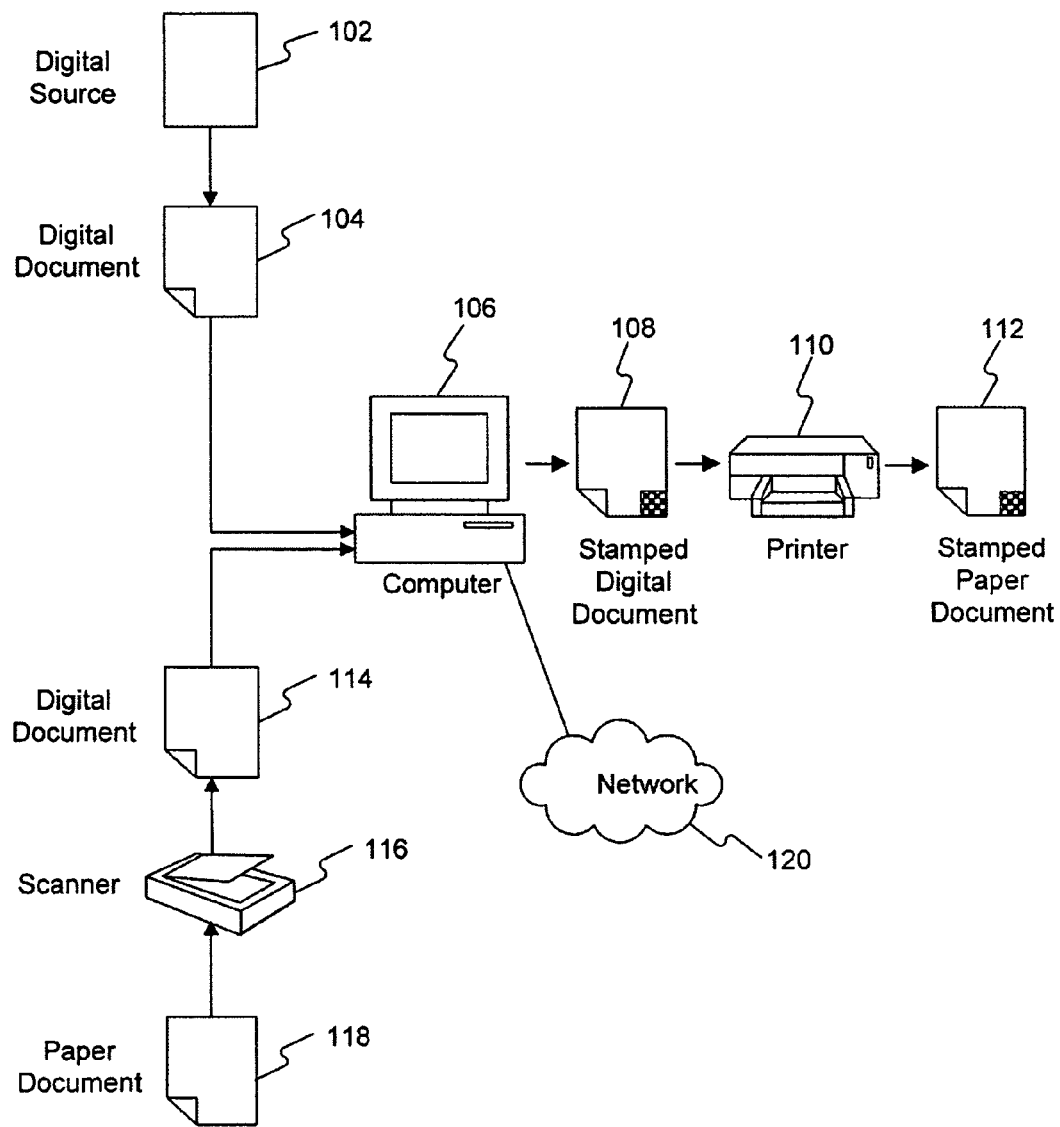
FIG. 1 is a block diagram illustrating embodiments of original image retrieval methods associated with image data processing systems consistent with certain aspects related to the present invention.

FIG. 1, is a block diagram of an exemplary system 100 illustrating how an image obtaining component of an image data processing system may involve one of several mechanisms for receiving an original image or original image data for processing. In one embodiment, an image obtaining component may be a scanner 116. In this implementation, a hardcopy paper document 118 may be scanned to produce a digital document 114 for transmission to a personal computer 106. Alternatively, an original image may be obtained as digital document 104 from any digital source 102 including, but not limited to, a locally connected media such as a floppy disk, CD-ROM, DVD, USB drive or any other data storage means. In further embodiments, an original image document may be obtained as transmitted from a network 120 such as a telephony-based network, a local area network (LAN), a wide area network (WAN), a wireless network, an intranet, the Internet or any other communication means. Computer 106 may thereby transmit and receive digital communications such as data files including documents to and from remote locations. Specifically, computer 106 may receive digital documents for processing via network 120. Moreover, computer 106 may transmit stamped digital documents after processing via network 120. In one embodiment, a digital image of a document may be received as an attachment to an email. In one or more embodiments, the image obtaining component may also include an internal information receiving element of a computer.

In another exemplary embodiment, an image data processing system may include a scanner, a personal computer 106, a printer, and a network, as shown in FIG. 1. In this implementation, an original image may be obtained by scanner 116 in communication with the personal computer. Specifically, scanner 116 may convert image data from paper document 118 into digital document 114 for transmission to computer 106 for processing. Accordingly, the storage component, processor and barcode producing component of computer 106 may create stamped digital document 108. Stamped digital document 108 may subsequently be printed as stamped paper document 112 by a printer 110 in communication with the personal computer. Here, stamped digital document 108 and stamped paper document 112 may each comprise a reproduction of the original image in combination with an overlapping barcode from which the original image may be reproduced.

In one or more embodiments, computer 106 may include a storage component, a processor, and a barcode producing component. The storage component may store a program of instructions including instructions for generating barcode data for a two-dimensional barcode to be associated with the original image, wherein the two-dimensional barcode encodes a representation of the original image such that the original image may be reproduced from the two-dimensional barcode. The storage component may include any type of memory such as: magnetic storage including floppy disk, hard disk, or magnetic tape; semiconductor storage such as solid state disk (SSD) or flash memory; optical disc storage such as CD-ROM, CD-RW, DVD, DVD-RW, Blu-ray, or HD DVD; magneto-optical disc storage; phase-change memory; or holographic storage. Furthermore, computer 106 may include one or more processors for processing data according to instructions stored in the storage component. The functions of the processor may be provided by a single dedicated processor or by a plurality of processors. Moreover, the processor may include, without limitation, digital signal processor (DSP) hardware, or any other hardware capable of executing software. The barcode producing component may produce a barcode based on the processed original image data, wherein the barcode has high enough resolution to embody the full representation of the original image. Specifically, a sufficient amount of information may be encoded within the barcode such that the original image may be digitally reproduced and/or printed without the need for access to any other stored image data. Accordingly, computer 106 may create stamped digital document 108 which includes both a reproduction of the original image as well as the barcode from which the original image may be further reproduced.

Figure 2A:
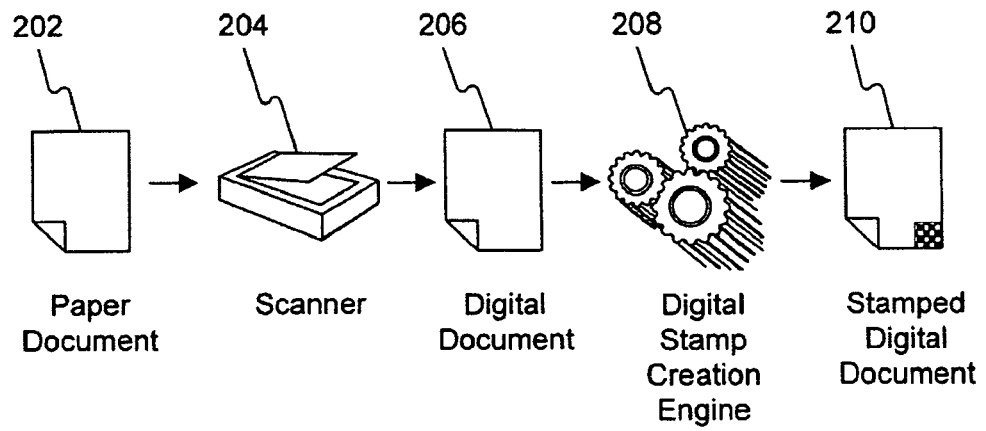
FIG. 2a is a block diagram illustrating an embodiment of a barcode stamping process consistent with certain aspects related to the present invention.

FIG. 2A is a block diagram illustrating another embodiment of an image data processing system that processes images and two-dimensional barcodes associated with the images. In this implementation, the system may include an image obtaining component 204 and a digital stamp creation engine 208. In this particular embodiment, image obtaining component 204 is a scanner which may receive an original image or original image data by scanning paper document 202. Scanner 204 may thereby produce digital document 206 for processing by digital stamp creation engine 208. In one embodiment, digital stamp creation engine 208 may include a storage component, a processor and barcode producing component. Accordingly, digital stamp creation engine 208 may convert digital document 206 into stamped digital document 210.

The storage component of digital stamp creation engine 208 may store a program of instructions for generating barcode data for a two-dimensional barcode to be associated with the original image, wherein the two-dimensional barcode encodes a representation of the original image such that the original image can be reproduced from the two-dimensional barcode. The processor of digital stamp creation engine 208 may process data according to instructions in the storage component. The barcode producing component of digital stamp creation engine 208 may produce the two-dimensional barcode from which the original image may be produced. Accordingly, digital stamp creation engine 208 may produce stamped digital document 210 which may include a reproduction of the original image and the two-dimensional barcode such that the barcode overlaps the reproduced image.

Figure 2B:
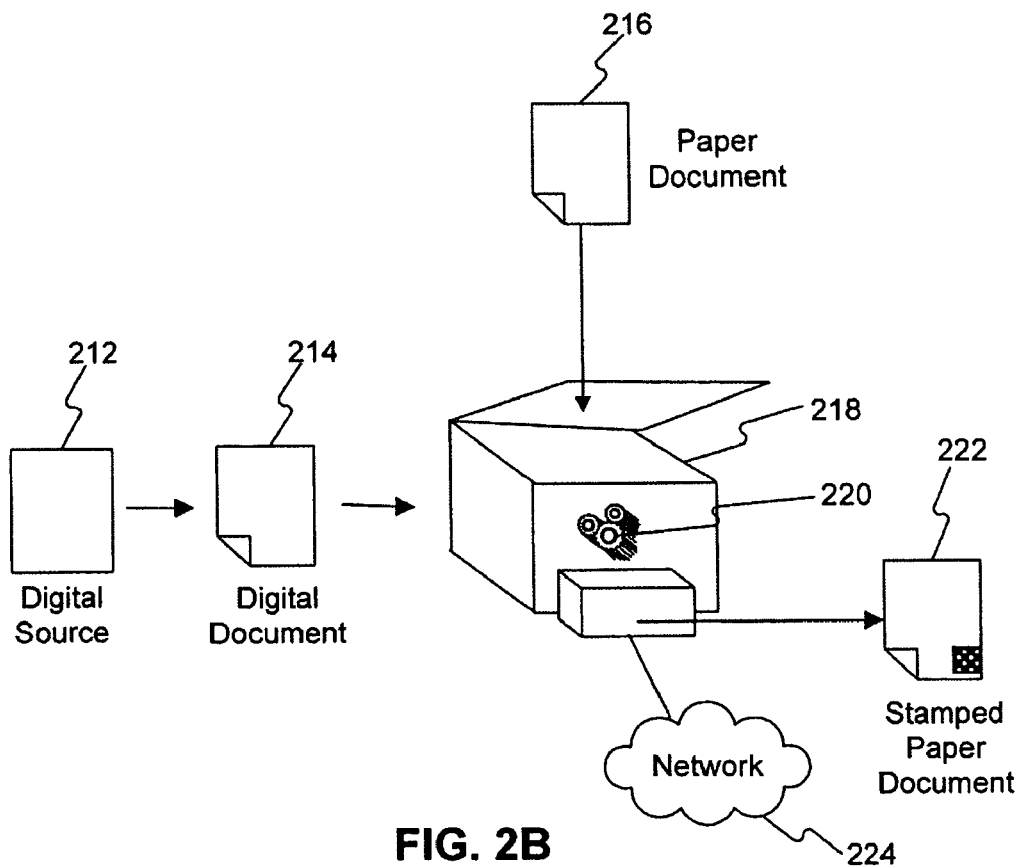
FIG. 2b is a block diagram illustrating an embodiment of a multi-function device type image processing system consistent with certain aspects related to the present invention.

FIG. 2B is a block diagram illustrating an exemplary image data processing system that may include a multi-function type device 218 (commonly known as "all-in-one" systems) and a network 224. Device 218 may include printing, fax and scanning capabilities, and may range from a small, consumer-type model, to a large, commercial or office-type device. In one embodiment, device 218 may include an image obtaining component, a built-in digital stamp creation engine 220 and a document producing component.

Network 224 may allow device 218 to communicate transmission or receipt of documents to and from remote locations via a telephony-based network, a local area network (LAN), a wide area network (WAN), a wireless network, an intranet, the Internet or any other communication means. Digital source 212 may include any locally connected media such as a floppy disk, CD-ROM, DVD, USB drive or any other data storage means. Accordingly, device 218 may obtain an original image either by scanning a paper document 216, by receiving a digital document 214 electronically from digital source 212 or by transmission from network 224. Moreover, device 218 may produce a document by either printing a stamped paper document 222 or by creating a stamped digital document for electronic transmission across network 224.

Digital stamp creation engine 220 may include a storage component, a processor, and a barcode producing component. The storage component of digital stamp creation engine 220 may store a program of instructions for generating barcode data for a two-dimensional barcode to be associated with the original image, wherein the two-dimensional barcode encodes a representation of the original image such that the original image can be reproduced from the two-dimensional barcode. The processor of digital stamp creation engine 220 may process data according to instructions in the storage component. The barcode producing component of digital stamp creation engine 220 may produce the two-dimensional barcode from which the original image may be produced. Accordingly, digital stamp creation engine 220 may produce a stamped document which may include a reproduction of the original image and the two-dimensional barcode such that the barcode overlaps the reproduced image.

Because the aforementioned systems allow the two-dimensional barcode to overlap the original image, it may be placed anywhere on the document or in the reproduced image. Moreover, because the two-dimensional barcode may be placed anywhere on the document or in the reproduced image, it may conceal confidential information in the document. These embodiments thereby overcome significant disadvantages of existing systems, such as the requirement for a search process to determine acceptable placement of the barcode and the inability to secure confidential information.

In further embodiments of the present invention, storage mediums are disclosed that store computer-readable programs of instructions for processing images and two-dimensional barcodes associated with the images. In this implementation, the programs of instructions may include instructions that instruct a processor to execute the steps of: obtaining an original image; processing the original image into encoded data; and rendering the encoded data into a two-dimensional barcode for association with the document (e.g., rendering on a reproduction of the document, placement on the original document, etc.). In still further embodiments of the present invention, the computer-readable programs may include: a code for a receiving step of receiving an original image; a code for a filtering step of filtering out noise and undesirable features from the original image; a code for a partitioning step of partitioning the original image into smaller cells; a code for an extracting step of extracting features from each of the cells to provide cell data; a code for a compressing step of compressing the cell data from each cell to yield compressed data; a code for a manipulating step of manipulating the compressed data to produce encoded data; and a code for a rendering step of rendering the encoded data into a two-dimensional barcode for association with the document (e.g., rendering on a reproduction of the document, placement on the original document, etc.).

The above computer-readable programs and codes may be embodied in any form of tangible media storage such as: magnetic storage including floppy disk, hard disk, or magnetic tape; semiconductor storage such as solid state disk (SSD) or flash memory (e.g., USB drive); optical disc storage such as CD-ROM, CD-RW, DVD, DVD-RW, Blu-ray, or HD-DVD; magneto-optical disc storage; phase-change memory; or holographic floppy disk or any other machine readable storage medium. In particular, when the above programs and/or codes are implemented into and executed by a computer, either by the above storage mediums or over a network such as a telephony-based network, a local area network (LAN), a wide area network (WAN), a wireless network, an intranet, the Internet or any other communication means, the computer becomes an apparatus and/or part of system for practicing the invention. That is, the programs and code, when embodied in or integrated with a processor, function to create a machine or apparatus having a unique structure of circuitry.

In a further embodiment of the present invention, a method of processing images and two-dimensional barcodes associated with the images is also disclosed. The method may include obtaining an original image; processing the original image into encoded data; and rendering the encoded data into a two-dimensional barcode for association with the document (e.g., rendering on a reproduction of the original image, placement on the original document, etc.).

Because the aforementioned storage mediums and methods allow the two-dimensional barcode to overlap the original image, it may be placed anywhere on the document or in the reproduced image. Moreover, because the two-dimensional barcode may be placed anywhere on the document or in the reproduced image, it may conceal confidential information in the document. These embodiments thereby overcome significant disadvantages of existing systems, such as the requirement for a search process to determine acceptable placement of the barcode and the inability to secure confidential information.

Figure 3:
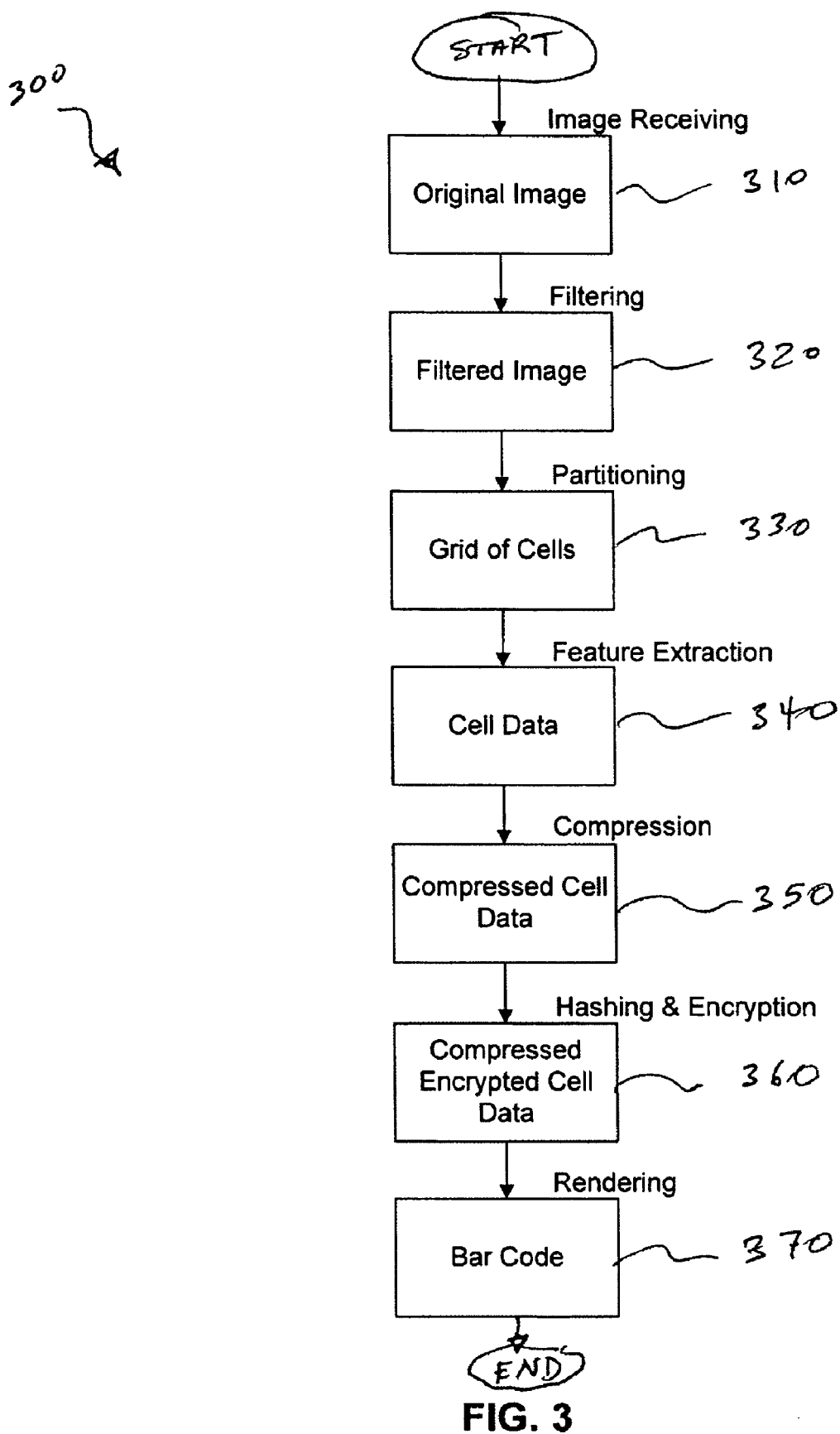
FIG. 3 is a flowchart illustrating an embodiment of image processing steps consistent with certain aspects related to the present invention.

FIG. 3 is a flowchart illustrating exemplary processing steps for processing image data of documents and associated barcodes. An original image may first be received, in step 310, by one of several methods. In one embodiment, an original image is obtained via a scanner. In this implementation, a hardcopy paper may be scanned into a digital image format for transmission to a personal computer. Alternatively, an original image may be obtained as a digital image of a document as transmitted over a network such as a telephony-based network, a local area network (LAN), a wide area network (WAN), a wireless network, an intranet, the Internet or any other communication means. In a further embodiment, a digital image of a document is received as an attachment to an email. An original image may also be obtained from locally connected media such as a floppy disk, CD-ROM, DVD, USB drive or any other data storage means.

Once an original image of a document has been received in digital format, the image may be filtered, step 320. Specifically, in a primarily textual file, font information may be distinguished from non-font information (e.g., dirt, spot etc.). In this implementation, non-font information may be deleted from the original digital document. In a further embodiment, a document containing photographic or graphical images may undergo photographic processing steps such as alterations to sharpness, brightness, contrast, tone, color or any other steps common to digital photo processing. Various features of an image may be removed, edited, thickened, thinned, separated etc. as desired until a filtered image is produced.

Subsequently, in step 330, the filtered image may be partitioned into smaller areas for feature extraction. In one exemplary embodiment, the original image may be a 300 DPI scan of a Letter size sheet (8.5 inches×11 inches). This results in an image size of 3300×2550 pixels. During the partitioning step, the image may be divided into a grid of cells varying in cell size depending on the capacity of the two-dimensional barcode stamp to be used and depending on the user's desired threshold of tamper detection. In one exemplary embodiment, a digital document is divided into a grid of 150×150 cells. Each cell therein is 22×17 pixels. In further embodiments, the document image may be divided into a grid of 32×32 cells, 64×64 cells, 128×128 cells, 150×150 cells, 256× 256 cells etc. depending upon desired resolution.

After partitioning, each cell may undergo a feature extraction step 340 so as to retrieve cell data. According to one embodiment, objects in each cell may be defined by an algorithm such as FFT, DCT, Area, Perimeter, Angles, or other algorithms as known in the art. Some content-based feature from each cell may be required in order to uniquely define the content of each cell. These features may be selected based on several methods as long as they can provide a unique definition of the content of the cell not easily produced by a different cell in the grid. In further embodiments, objects in each grid may simply be defined by bitmap or other Raster representation.

Each set of extracted cell data may then be compressed 350 and, optionally, encoded. According to certain embodiments, due to size limitation of the two-dimensional barcode stamp, the compressed feature data may require hashing, as in step 360, such that it occupies a single byte. In one exemplary embodiment, the size of the stamp may be approximately 3600 bits (i.e., 450 bytes). Each set of extracted cell data may be compressed and hashed into 1 byte by a Hash Function. In a 150×150 grid there are 374 blocks, each of 1 byte, which fits the capacity of a 450 byte stamp thus allowing for additional data for Error correction, check sum, or other supplemental functionality. In this implementation, the 374 bytes of compressed data may be RSA encrypted with a pubic key prior to embedding in order to resist reverse engineering. After the document image data has been compressed and encrypted, the compressed and encrypted cell data may be passed to a barcode renderer which renders a barcode, in step 370, for association with the original image or reproduction of the original image.

It will be apparent to those skilled in the art that many different processing methods may be suitable for implementing the functionality of the above processing steps. Specifically, the particular above-referenced steps along with the flowchart of FIG. 3 are merely one exemplary embodiment of the myriad available processing steps applicable to the present principles and within the scope of the present invention. That is, alternative steps and sequences in the process of encoding and decoding between original document image data and barcode data are applicable to and consistent with the present system and method for generating a barcode, from which an original image may be reproduced, wherein the barcode overlaps a portion or all of the original image.

Figure 4A:
FIGS. 4a-4f are diagrammatic representations of varying embodiments of barcode overlap consistent with certain aspects related to the present invention.
Figure 4B:
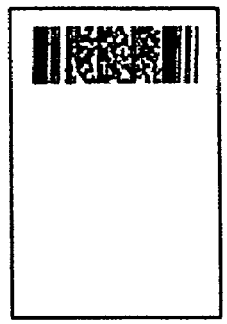
Figure 4C:
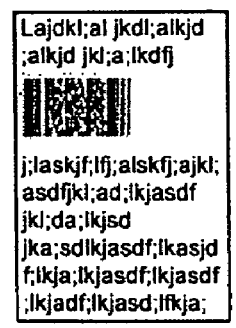
Figure 4D:
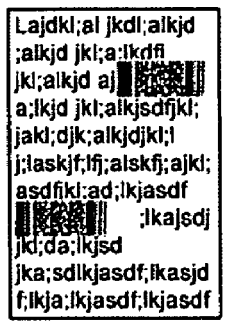
Figure 4E:
Figure 4F:
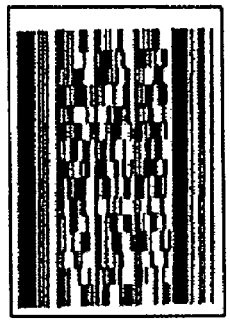

FIGS. 4a-4f illustrate various embodiments of reproduced original images wherein barcodes overlap the original images. As described above, reproduced images with overlapping barcodes may include both paper documents and electronic documents. The various arrangements of FIGS. 4a-4f are to be understood as merely exemplary of the extent of barcode overlap contemplated by the present invention. In the embodiment of FIG. 4a, a barcode may be located in the lower, right-hand corner of the image. In this implementation, the barcode may either overlap only blank portions (e.g., margins) of the reproduced image or it may overlap text, graphics, page numbers or other printed matter in that location. In the embodiment of FIG. 4b, a barcode may be located at the top of the document. In such a configuration, the barcode may be useful in concealing the title and other identifying information of a document. The barcode may function as a machine-readable substitute for the title bar of a document while, at the same time, encoding the entire contents of the document therein for reproduction of and/or comparison to the contents below. In the embodiments of FIGS. 4c and 4d, a barcode or barcodes may be been located over particular areas of textual or graphical information. In this implementation, a user may advantageously redact or censor certain information from the document which may be sensitive, confidential or otherwise vulnerable to interception. FIGS. 4e and 4f illustrate embodiments wherein a substantial portion or all of a document may be concealed by the barcode. Such embodiments may be useful wherein a user desires to conceal anywhere from a substantial portion of the document to the entire document. In this implementation, a user may ensure that documents become safe for transmission via mail, fax, email, courier, network or otherwise. The document, however, may be scanned and decoded upon receipt by the intended recipient for retrieval of the entire document image. In a further embodiment, the recipient may be provided only with the instructions sufficient to retrieve portions authorized for receipt by the sending user.

Figure 5:
FIG. 5 is a block diagram illustrating a black and white barcode consistent with certain aspects related to the present invention.
Figure 6:
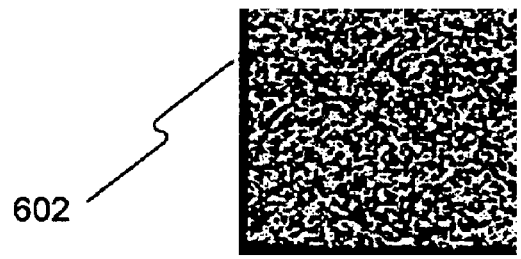
FIG. 6 is a block diagram illustrating an 8-Bit grayscale barcode consistent with certain aspects related to the present invention.
Figure 7:
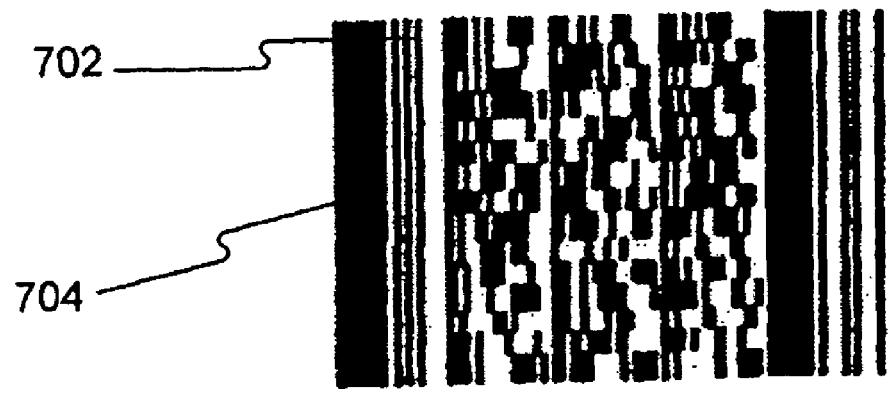
FIG. 7 is a block diagram illustrating a PDF417 barcode consistent with certain aspects related to the present invention.
Figure 8:
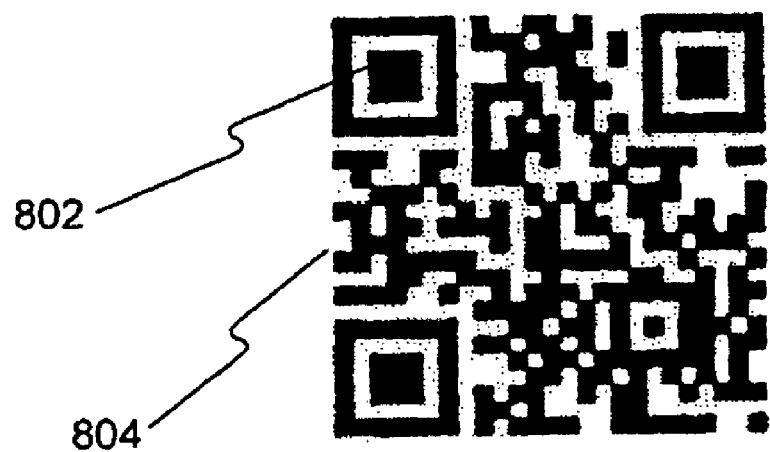
FIG. 8 is a block diagram illustrating a QRCODE barcode consistent with certain aspects related to the present invention.

With regard to the various two-dimensional barcodes described throughout in connection with the invention, such barcodes are well known to those of skill in the art. Examples of these barcodes include U.S. Pat. No. 5,490,217, which discloses a high capacity two-dimensional barcode for association with a document, U.S. Pat. No. 5,513,264, which discloses one-dimensional codes such as UPC, Code 39, and Code 128, two-dimensional barcodes such as PDF 417, Code 49 and Code 16K, matrix codes such as Data Code, Code 1, Vericode and MaxiCode, and graphic codes such as Glyphs, U.S. Pat. No. 6,565,003, which discloses a two-dimensional barcode having a 20×20 array of data bits, and U.S. Pat. No. 6,753,977, which discloses a document barcode that is imperceptible to the human eye. Several particular barcodes are disclosed herein, however, merely for the purpose of showing exemplary barcodes and features. In one embodiment of the present invention, the rendered barcode is a rectangular, two-dimensional barcode. Specifically, FIG. 5 illustrates one type of black & white bar code having a tile size of 5×5 pixels, wherein the maximum digital only data capacity is 90,000 bits and the maximum closed loop data capacity is 3,600 bits. This size of this barcode may allow for effective reading, printing and scanning. FIG. 6 illustrates an 8 Bit grayscale barcode having a tile size of 1×1 pixels, wherein the maximum digital only data capacity is 720,000 bits and the maximum closed loop data capacity is 28,800 bits. Comparatively, this barcode may have lower printing and scanning effectiveness. Higher capacity barcodes such as the PDF417 shown in FIG. 7 and the QRCODE shown in FIG. 8 may also be applicable to the present disclosure.

It will be apparent to those skilled in the art that many different barcodes may be suitable for implementing the functionality of the present systems and methods as described above. The barcodes listed are intended to be merely exemplary and not limiting in any way. Furthermore, applicable barcodes are intended to encompass both structural and functional equivalents of those listed. Additionally, it is intended that such equivalents include both currently known barcode equivalents as well as any equivalents developed in the future.

Figure 9:
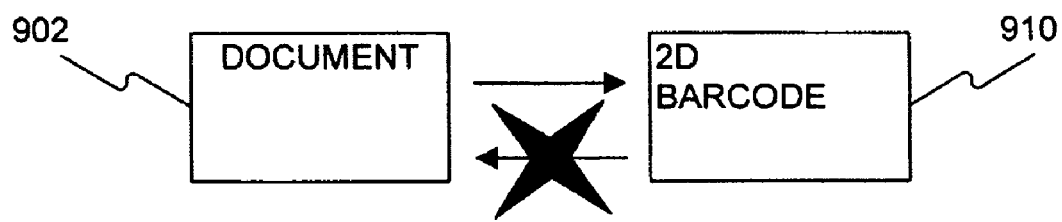
FIG. 9 is a block diagram illustrating one-way barcode creation.
Figure 10:
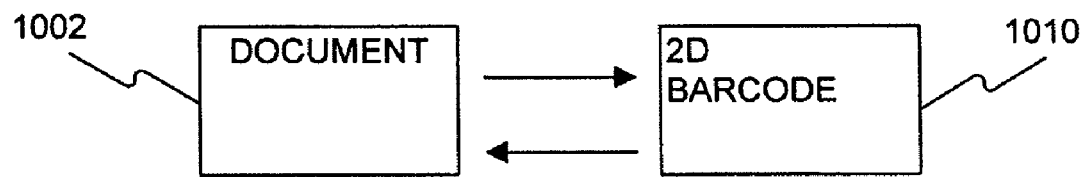
FIG. 10 is a block diagram illustrating an embodiment of two-way barcode-to-document verification consistent with certain aspects related to the present invention.

According to further embodiments of the present invention, the image data processing system and its method of use may involve two-way verification or authentication between the contents of an original image and the barcode associated with it. Previous systems and methods as shown in FIG. 9 lacking this advantageous feature involve only one-way flow of data. After document image data from document 902 has been rendered as a barcode 910, there is no assurance that the document retains the same information as stored in the barcode. Alternatively, FIG. 10 illustrates a block diagram of an exemplary embodiment of the present invention wherein document and barcode data may be compared to determine whether or not the barcode accurately represents the content of the document. This may be particularly helpful for indicating whether or not a document has been tampered with or otherwise edited after the barcode has been rendered and affixed thereto. Particularly, image data from 1002 may be rendered as barcode 1010 according to systems and methods as described above. Advantageously, barcode 1010 may be subsequently decoded for comparison to the contents of document 1002. Comparison between the two sets of information may occur at various increments along the spectrum between document and barcode. For example, barcode 1010 may be decoded and reproduced as a document image for subsequent optical scan and comparison between the two document images. Alternatively, document 1002 may be encoded and rendered as a barcode for subsequent optical scan and comparison between the two barcodes. In further embodiments, document 1002 undergoes at least a portion of the processing necessary to produce the binary data used for rendering an associated barcode. Barcode 1010 may undergo at least a portion of the decoding necessary to produce the binary data used for reconstructing an image. According to a further embodiment, the contents of barcode 1010 and the contents of document 1002 are compared as two sets of alphanumeric data for the purpose of determining whether or not barcode 1010 represents the actual condition of document 1002.

Figure 11:
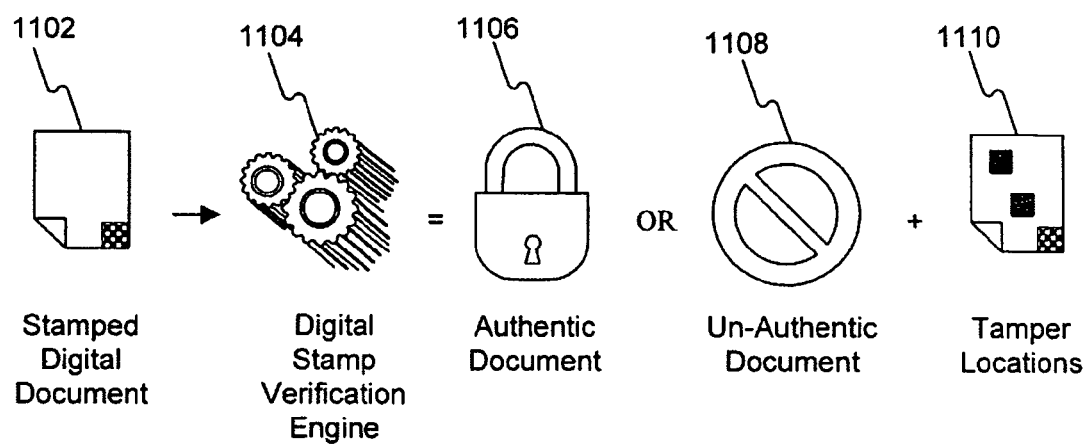
FIG. 11 is a block diagram illustrating an embodiment including document verification with tamper notification consistent with certain aspects related to the present invention.

In a further embodiment, as illustrated in FIG. 11, two-way verification between the document and barcode may be manifested to a user in a tangible form such as by indication of tamper locations on the document. In this embodiment, stamped digital document 1102 may undergo processing by digital stamp verification engine 1104. Digital stamp verification engine 1104 may include an image obtaining component, a storage component, a processor, a barcode producing component and an authenticated/unauthenticated document producing component. The image obtaining component may receive information from the image of a digital document as well as from the barcode associated with the document. The storage component may store a program of instructions for comparing barcode data of the two-dimensional barcode and image data of the digital document. The processor may process data according to instructions in the storage component. The document producing component may produce a document including a reproduction of the original document indicating results of the comparison by the digital stamp verification engine. Accordingly, the image data processing system will output either indication of an authentic document 1106 or indication of an unauthentic document 1108 in addition to indication on the document of the inconsistent tamper locations 1110.

Figure 12:
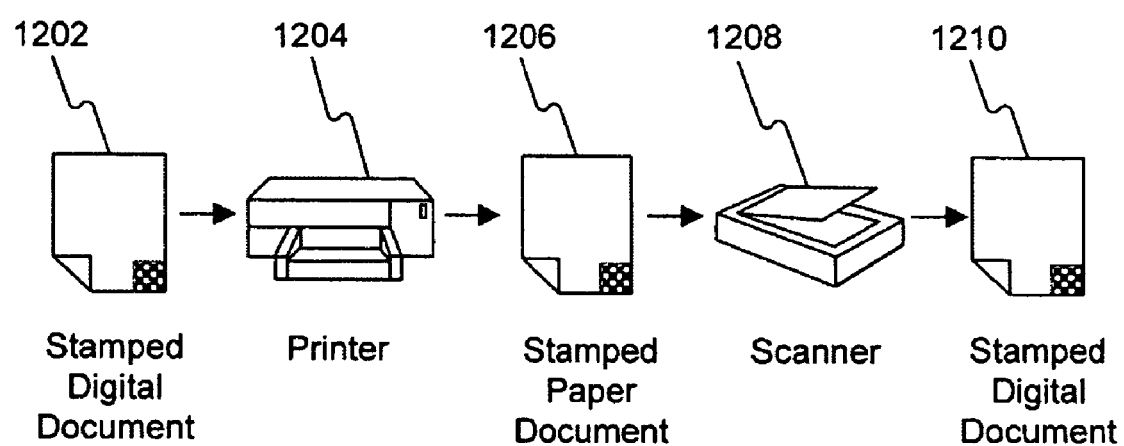
FIG. 12 is a block diagram illustrating closed-loop barcode to document verification consistent with certain aspects related to the present invention.

FIG. 12 illustrates the versatility of a closed loop system according to an exemplary embodiment of the present disclosure. Specifically, stamped digital document 1202 may be converted into stamped paper document 1206 by printer 1204 or another document producing component. Stamped paper document 1206 may be physically transported anywhere in the world or stored for any period of time. As desired by the user, image data of stamped paper document 1206 may be subsequently obtained by scanner 1208 or another document obtaining component in order to produce stamped digital document 1210. Accordingly, stamped digital document 1210 may be analyzed for comparison between the barcode and document contents, as well as, for comparison to previous stamped digital document 1202 consistent with the systems and methods as described above.

It should be noted that the foregoing embodiments merely illustrate the various principles of the present invention. Those skilled in the art will therefore be able to formulate variations of the foregoing embodiments which are not explicitly disclosed herein, but which are within the scope of the present principles. Moreover, those embodiments and examples disclosed herein along with any statements, conditional language or recitations are intended to be only for purposes of aiding the reader in understanding those principles. It is further intended that the scope of the embodiments and examples herein include structural and functional equivalents including both those currently known, and those developed in the future.

Accordingly, it will further be appreciated by those skilled in the art that the diagrams, flowcharts, and block diagrams illustrated herein are merely intended to assist the reader in understanding certain embodiments of the concepts and principles contemplated by the present invention. Other embodiments of the invention will be apparent to those skilled in the art from consideration of the specification and practice of the invention disclosed herein. It is intended that the true scope and spirit of the present invention be indicated by the following claims.

What is claimed is:

1. An image data processing system that processes images and two-dimensional barcodes associated with the images, the system comprising:
   an image obtaining component that receives an original image or original image data to be processed;
   a storage component that stores a program of instructions including instructions for generating barcode data for a two-dimensional barcode to be associated with the original image, wherein the two-dimensional barcode encodes a representation of the original image such that the original image can be reproduced from the two-dimensional barcode;
   a processor that processes the image data;
   a barcode producing component that produces the two-dimensional barcode based on the original image data; and
   a document producing component that creates a reproduction of the original image such that the two-dimensional barcode overlaps the reproduced image;
   wherein the processor executes image data producing programming that enables the barcode to overlap and be placed anywhere in the reproduced image without searching to determine one or more acceptable placement regions for the barcode.

2. The image data processing system of claim 1, the system further comprising:
   a printing device in communication with the personal computer configured to print the high resolution two-dimensional barcode and reproduced image;
   wherein the storage component, processor and barcode producing component are associated with a personal computer; and
   wherein the image obtaining component is a scanner.

3. The image data processing system of claim 1 wherein the barcode conceals a portion of the original document on which confidential information is disclosed.

4. The image data processing system of claim 3 wherein the original image is obtained by scanning a hardcopy paper document.

5. The image data processing system of claim 3 wherein the original image is obtained by receiving digital data of the image.

6. The image data processing system of claim 1 wherein one or more of the processor, the barcode producing component, and the document producing component are separate components.

7. An image data processing system that processes images and two-dimensional barcodes associated with the images, the system comprising:
   a scanner that receives an original image or original image data to be processed;
   a personal computer comprising:
      a storage component that stores a program of instructions including instructions for generating a two-dimensional barcode associated with the original image, wherein the two-dimensional barcode encodes a representation of the original image such that the original image can be reproduced from the two-dimensional barcode;
      a processor that processes the image data; and
      a barcode producing component that produces the barcode based on the original image data; and
   a document producing component that creates a reproduction of the original image such that the two-dimensional barcode overlaps the reproduced image;
   wherein the processor executes image data producing programming that enables the barcode to overlap and be placed anywhere in the reproduced image without searching to determine one or more acceptable placement regions for the barcode.

8. A method of processing images and two-dimensional barcodes associated with the images, the method comprising:
   obtaining an original image;
   processing the original image into encoded data;
   rendering the encoded data into a two-dimensional barcode to be associated with a reproduction of the original image; and
   executing image data producing programming that enables the barcode to overlap and be placed anywhere in the reproduction of the original image without searching to determine one or more acceptable placement regions for the barcode.

9. The method of claim 8 wherein the barcode conceals a portion of the original document on which confidential information is disclosed.

10. The method of claim 8 wherein the barcode overlaps at least a majority of the original image.

11. The method of claim 8 wherein the step of processing the original image comprises:
    filtering out noise and undesirable features from the original image;
    partitioning the image into a grid of cells;
    extracting features from each of the cells to provide cell data;
    compressing the cell data from each cell to yield compressed cell data; and
    manipulating the compressed data to produce encoded data.

12. The method of claim 11 wherein the original image is obtained by scanning a hardcopy paper document.

13. The method of claim 11 wherein the original image is obtained by receiving digital data of the image.

14. A storage medium that stores computer-readable programs of instructions, the programs of instructions including instructions that instruct a processor to execute the steps of:
    obtaining an original image;
    processing the original image into encoded data;
    rendering the encoded data into a two-dimensional barcode to be associated with a reproduction of the original image; and
    executing image data producing programming that enables the barcode to overlap and be placed anywhere in the reproduction of the original image without searching to determine one or more acceptable placement regions for the barcode.

15. The storage medium of claim 14 wherein the barcode overlaps at least a majority of the original image.

16. The storage medium of claim 14 wherein the barcode conceals a portion of the original document on which confidential information is disclosed.

17. The storage medium of claim 14 wherein the step of processing the original image comprises:
- filtering out noise and undesirable features from the original image;
- partitioning the image into a grid of cells;
- extracting features from each of the cells to provide cell data;
- compressing the cell data from each cell to yield compressed cell data; and
- manipulating the compressed data to produce encoded data.

18. The storage medium of claim 17 wherein the original image is obtained by scanning a hardcopy paper document.

19. The storage medium of claim 17 wherein the original image is obtained by receiving digital data of the image.

20. A storage medium storing a control program that processes images and two-dimensional barcodes associated with the images, the control program comprising:
- a code for a receiving step of receiving an original image;
- a code for a filtering step of filtering out noise and undesirable features from the original image;
- a code for a partitioning step of partitioning the original image into smaller cells;
- a code for an extracting step of extracting features from each of the cells to provide cell data;
- a code for a compressing step of compressing the cell data from each cell to yield compressed data;
- a code for a manipulating step of manipulating the compressed data to produce encoded data; and
- a code for a rendering step of rendering the encoded data into a two-dimensional barcode to be associated with a reproduction of the original image;
- wherein, because the two-dimensional barcode may overlap the original image, it can be placed anywhere in the reproduced image, and the need for a search process to determine acceptable placement of the barcode is thereby eliminated.

21. An image data processing system comprising:
- means for obtaining an original image or original image data to be processed;
- means for storing a program of instructions including instructions for generating barcode data for a two-dimensional barcode to be associated with the original image, wherein the two-dimensional barcode encodes a representation of the original image such that the original image can be reproduced from the two-dimensional barcode;
- means for processing the image data;
- means for producing the original image and the two-dimensional barcode such that the two-dimensional barcode overlaps the original image; and
- means for executing image data producing programming that enables the barcode to overlap and be placed anywhere in the reproduction of the original image without searching to determine one or more acceptable placement regions for the barcode.

* * * * *